A. B. DRÄGER.
WELDING BURNER.
APPLICATION FILED JULY 14, 1909.
971,430.
Patented Sept. 27, 1910.
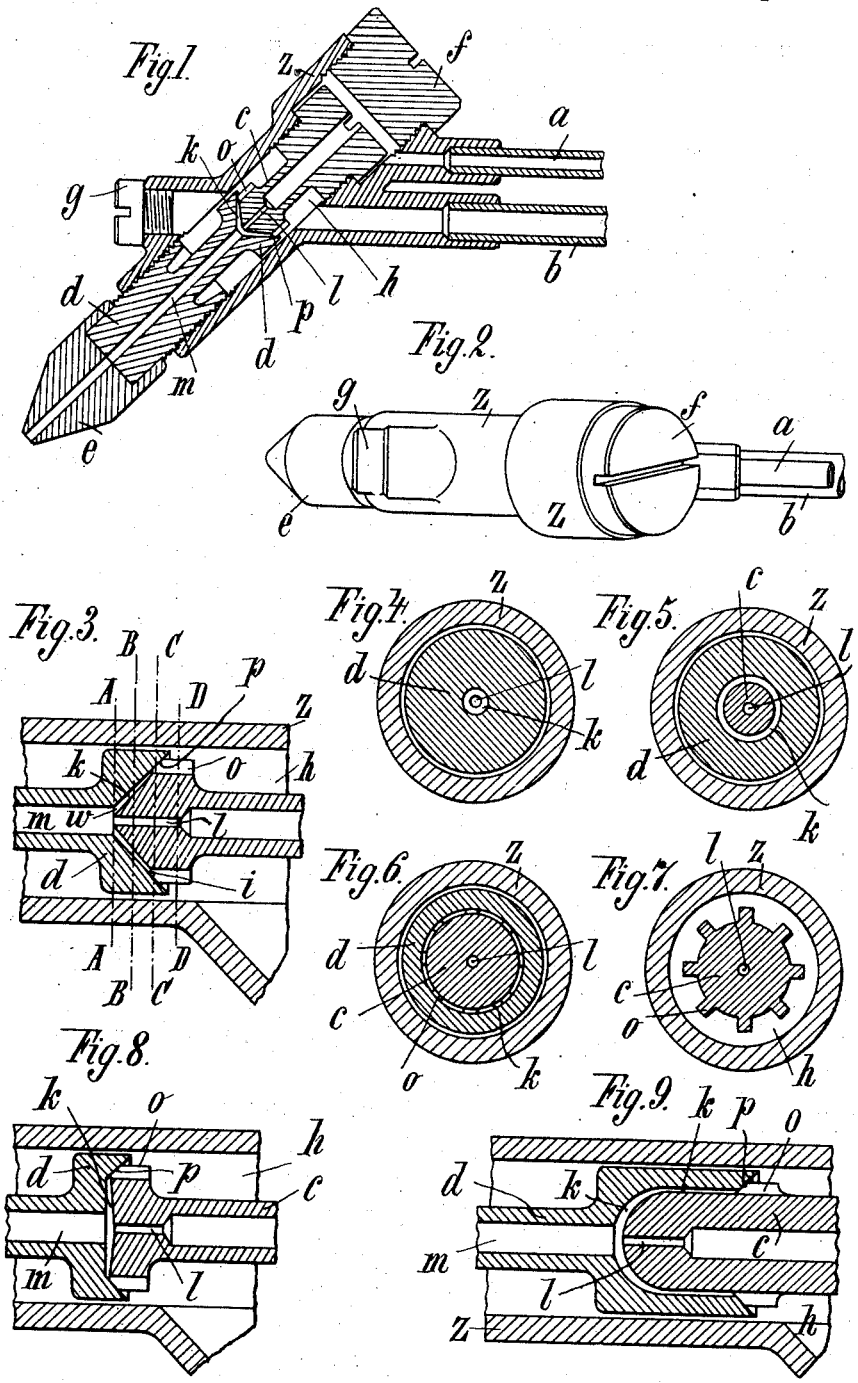

UNITED STATES PATENT OFFICE.

ALEXANDER BERNHARD DRÄGER, OF LÜBECK, GERMANY, ASSIGNOR TO THE FIRM OF DRÄGERWERK, HEINR. & BERNH. DRÄGER, OF LÜBECK, GERMANY.

WELDING-BURNER.

971,430.      Specification of Letters Patent.    Patented Sept. 27, 1910.

Application filed July 14, 1909. Serial No. 507,550.

*To all whom it may concern:*

Be it known that I, ALEXANDER BERNHARD DRÄGER, a subject of the German Emperor, and resident of Lübeck, Germany, have invented certain new and useful Improvements in Welding-Burners, of which the following is a specification.

This invention relates to burners for welding purposes, and more particularly to such burners of the kind in which a combustible gas, for instance acetylene, is drawn into the burner tube by oxygen by means of a suction nozzle, for the purpose of producing a gaseous mixture for generating the welding flame. Such a burner comprises a pressure nozzle for the compressed oxygen and a suction nozzle in which the jet of oxygen produces a suction whereby the combustible gas surrounding the pressure nozzle is drawn into a mixing passage where it mixes with the oxygen. In burners of this kind it is a frequent occurrence for the welding flame to strike back.

Now the present invention has for its object to provide an improved burner in which the welding flame is prevented from striking back into the suction nozzle or into the suction chamber surrounding the pressure nozzle into which the combustible gas is delivered.

A further object of this invention is to compel the flame when striking back, to leave the burner again.

It is well known that a welding flame like every oxygen-hydrogen flame, can be prevented from striking back only when the speed of the gaseous mixture in the mixing tube in the outward direction is greater than the velocity of the travel of the ignition in the backward direction. The striking back of the flame is frequently due to ignited particles of iron flying back into the mixing tube. If there is an enlargement of the mixing tube whereby the gaseous mixture is caused to flow through the same at a reduced speed, the flame on striking back will find a lodgment and will continue to burn at that place. A place of this nature in ordinary welding burners, where the back flame is particularly liable to find a lodgment is the small space between the outlet of the pressure nozzle and the inlet of the suction nozzle, that is, the outlet of the conical annular space between the conical surfaces of the pressure nozzle and the suction nozzle through which the combustible gas that is drawn in, must flow in order to reach the mixing passage above the suction nozzle.

Now the present invention consists substantially in dimensioning the delivery passage or slit for the combustible gas from its commencement between the pressure and suction nozzles up to the inlet of the mixing passage, in such a manner that the said delivery passage or slit shall have throughout its entire length an equal or approximately equal cross section of flow, so that the combustible gas shall have a uniform or equal speed of flow through all the passages to which the flame can get access. The arrangement is such that a flame having a tendency to become lodged, for instance at the outlet of the pressure nozzle, by reason say, of its excess of oxygen, will be forcibly enriched with combustible gas, and will be blown away as the speed of the travel of the ignition is overcome.

This invention thus solves the problem of insuring the presence of a gaseous mixture having a uniform speed of flow in all the passages that are accessible to the flame.

If the speed of flow to be made rather greater than the speed of ignition then if the welding flame should be caused to strike back by external influences, such as for instance, by sparks, or by the gas or gases becoming throttled due to careless immersing of the burner mouthpiece into molten metal, the said flame will be blown out as soon as these injurious influences cease to exist.

Three constructions of a burner according to this invention are illustrated by way of example in the accompanying drawings in which:—

Figures 1 to 7 show one construction; Fig. 1 being a longitudinal section of the burner; Fig. 2 a plan of the burner shown in Fig. 1; Fig. 3 is a central longitudinal section of the improved nozzle parts of the burner drawn to a larger scale; Figs. 4, 5, 6 and 7 are cross sections respectively on the lines A, B, C and D of Fig. 3. Fig. 8 shows a second construction; and Fig. 9 shows a third construction of the improved burner.

Referring to Figs. 1 to 7, $a$ is the pipe for the supply of compressed oxygen, and $b$ is the pipe for the supply of the combustible gas; $z$ is the burner shell; $c$ is the body of the pressure nozzle screwed into one end of the burner shell; $d$ is the body of the suction nozzle screwed into the opposite end of the burner shell, with the mixing passage, $m$, and the mouthpiece, $e$; $f$ and $g$ are two screw plugs provided in the burner shell, $z$, for cleaning purposes.

$h$ (Figs. 1 and 3) is an annular suction chamber for the delivery of the combustible gas; $k$ is a slot-like annular passage for the delivery of the combustible gas between the pressure and suction nozzles; it is shown as being of conical form in cross section but this is only by way of example.

$i$ is the inlet and $w$ is the outlet of the annular passage, $k$.

In order that the hereinbefore stated results shall be effected, it is necessary that the annular slot, $k$, for the delivery of the combustible gas shall be constructed with particular care, that is to say so that the speed of flow of the delivered combustible gas shall be the correct speed, especially at the outlet, $w$, of the annular slot, $k$. The correct speed of flow must be ascertained or determined by experiment for each burner. It is preferred to make the annular slot of conical form, in which case the cross sectional area of the slot must be approximately equal at all points, that is, the clear cross sectional area of the slot on the line A (Fig. 3) must be equal to each of the clear cross-section areas on the lines B, C, and D of Fig. 3 (see Figs. 4 to 7).

In order to maintain a determined width of the annular slot formed by the pressure and suction nozzles, a number of nibs, $o$, having bearing faces, $p$, are provided on the outer edge of one of the two nozzles to serve as a bearing for the other nozzle which is screwed against it. These nibs may be formed very simply by making the nozzle in question with an encircling bead, and then filing this bead away at several places (Fig. 7) so as to form a sufficient number of passages for the combustible gas between the nibs or portions, $o$, of the bead that have been left standing. The nibs, $o$ $p$, which determine the distance between the pressure and suction nozzles, have also another important function, namely, since the passages, $l$, and $m$, in the nozzles, $c$ and $d$, are of comparatively small cross section, these passages must be situated exactly central and opposite to each other, if there is to be an efficient suction.

The correct relative positions of the nozzles are insured according to the present invention by connecting the head of the suction nozzle (screwing with a slight amount of "play" into the burner shell $z$) to the body of the suction nozzle by means of a slender neck portion. Then in screwing the suction nozzle or the pressure nozzle into the burner shell, the slender neck portion allows sufficient lateral mobility to the suction nozzle head to enable the latter to center itself automatically against the nibs, $o$ $p$.

Instead of the suction nozzle, the pressure nozzle may be formed with an automatically self-centering head. Or both nozzles may be formed with a slender neck portion of sufficient lateral flexibility for the purpose of rendering them self centering as shown.

Fig. 8 shows another construction and Fig. 9 shows a further construction of the improved nozzle parts of the burner. The natures of these constructions are obvious from the drawings and will therefore not be described further.

In cases where both gases are under pressure, the improved construction of the burner will produce a mutual suction upon the two gases. This is desirable in the case of welding burners using compressed oxygen and compressed hydrogen. In such a case the passage $l$ and the delivery slot $k$ are made of approximately equal cross sections. If the compressed oxygen flowing through the passage into the mixing passage of the suction nozzle has the higher pressure, the hydrogen will be drawn through the slot $k$. But if the compressed hydrogen flowing through the slot $k$, into the mixing passage of the suction nozzle has the higher pressure, the oxygen will be drawn from the passage $l$. In this manner the improved burner acts as a safety mixing burner in which the striking back of either gas under pressure into the delivery passage of the other gas under pressure is prevented.

I claim:

1. A welding burner comprising a suction nozzle and a pressure nozzle having laterally movable ends and, means on their juxtaposited coöperating faces adapted to automatically center the two nozzles with relation to each other in the assembling of the burner.

2. A welding burner comprising a casing, a suction nozzle and a pressure nozzle mounted therein and having laterally movable ends and, longitudinal passages and means to automatically bring the longitudinal axes of the latter into alinement.

3. A welding burner, comprising a suction nozzle having a conical rear face, a pressure nozzle having a conical face of less conicity from that of the suction nozzle, one of said nozzles provided with longitudinal ribs which have end engagement with the conical face of the other nozzle.

4. A welding burner comprising a pressure nozzle and a suction nozzle having flexible neck portions, and means on the juxtaposited coöperating faces of the nozzles capable of imparting relative lateral movement to said neck portions.

5. A welding burner, comprising a casing, a suction nozzle mounted therein having a conical rear face, a pressure nozzle mounted in the casing in rear of the suction nozzle, having a front face of less conicity than said rear face and coöperating with the latter to form an annular delivery passage of approximately the same cross-sectional area at all points as the cross-sectional area of its inlet and outlet and which communicates with a mixing passage in the suction nozzle.

6. A welding burner comprising a casing, a suction nozzle mounted therein having a conical rear face, a pressure nozzle, mounted in the casing in rear of the suction nozzle, having a front face of less conicity than said rear face and coöperating with the latter to form an annular delivery passage of approximately the same cross-sectional area at all points as the cross-sectional area of its inlet and outlet and which communicates with a mixing passage in the suction nozzle, said pressure nozzle forming an annular gas chamber in the casing in rear of and communicating with said delivery passage.

7. A welding burner comprising a casing, a suction nozzle mounted therein having a conical rear face, a pressure nozzle, mounted in the casing in rear of the suction nozzle, having a front face of less conicity than said rear face and coöperating with the latter to form an annular delivery passage of approximately the same cross-sectional area at all points as the cross-sectional area of its inlet and outlet and which communicates with a mixing passage in the suction nozzle, said pressure nozzle forming an annular gas chamber in the casing in rear of and communicating with said delivery passage, and also forming a chamber in rear of the gas chamber which communicates with the delivery passage and mixing passage through a passage in said pressure nozzle.

8. A welding burner comprising a casing, a suction nozzle mounted therein having a conical rear face, a pressure nozzle, mounted in the casing in rear of the suction nozzle, having a front face of less conicity than said rear face and coöperating with the latter to form an annular delivery passage of approximately the same cross-sectional area at all points as the cross-sectional area of its inlet and outlet and which communicates with a mixing passage in the suction nozzle, said pressure nozzle forming an annular gas chamber in the casing in rear of and communicating with said delivery passage, and also forming a chamber in rear of the gas chamber which communicates with the delivery passage and mixing passage through a passage in said pressure nozzle, a gas conduit communicating with the annular chamber and an air conduit communicating with the rear chamber.

9. A welding burner comprising a casing closed at one end, a pressure nozzle mounted in the casing forming an air chamber in the rear end of the latter, an air conduit communicating with said chamber, a suction nozzle, mounted in the casing in front of the pressure nozzle, having a conical rear face which forms with the front conical face of the pressure nozzle, an annular delivery passage of approximately the same cross sectional area at all points which communicates with a mixing passage in the suction nozzle, said pressure nozzle forming an annular gas chamber in the casing in rear of and communicating with said delivery passage, a gas conduit communicating with the annular chamber, and ribs on the pressure nozzle to engage the conical rear face of the suction nozzle and automatically bring the longitudinal axes of the nozzles into alinement.

ALEXANDER BERNHARD DRÄGER.

Witnesses:
 OSCAR SCHWISHLER,
 JOHS. WULF.